US 8,853,998 B2

(12) United States Patent
Aldana et al.

(10) Patent No.: US 8,853,998 B2
(45) Date of Patent: Oct. 7, 2014

(54) PORTABLE ELECTRONIC DEVICE DOCK HAVING A CONNECTOR MOVABLE IN RESPONSE TO A MAGNETIC FORCE

(75) Inventors: Leonardo Aldana, Waterloo (CA); Ming-Lun Dave Ma, Kitchener (CA)

(73) Assignee: Blackberry Limited, Waterloo (CA)

( * ) Notice: Subject to any disclaimer, the term of this patent is extended or adjusted under 35 U.S.C. 154(b) by 409 days.

(21) Appl. No.: 13/304,911

(22) Filed: Nov. 28, 2011

(65) Prior Publication Data

US 2013/0002193 A1    Jan. 3, 2013

Related U.S. Application Data

(60) Provisional application No. 61/503,450, filed on Jun. 30, 2011.

(51) Int. Cl.
*H01M 10/46* (2006.01)
*G06F 1/16* (2006.01)

(52) U.S. Cl.
CPC .................................. *G06F 1/1632* (2013.01)
USPC .......................................................... 320/107

(58) Field of Classification Search
USPC ......................................... 320/107, 114, 115
See application file for complete search history.

(56) References Cited

U.S. PATENT DOCUMENTS 5,909,100 A * 6/1999 Watanabe et al. ............ 320/108
7,498,546 B2 3/2009 Belongia et al.
7,775,801 B2 8/2010 Shiff et al.
7,839,120 B2 11/2010 Elizalde Rodarte
7,901,216 B2 3/2011 Rohrbach et al.
7,916,467 B2 3/2011 Hotelling et al.
2011/0098087 A1 4/2011 Tseng

FOREIGN PATENT DOCUMENTS

| CN | 101630861 A | 1/2010 |
|---|---|---|
| CN | 101681186 A | 3/2010 |
| KR | 10-2006-0018178 A | 2/2006 |
| KR | 10-2009-0050834 | 5/2009 |

OTHER PUBLICATIONS

Office Action dated Sep. 25, 2013, issued from the corresponding Korean patent application No. 10-2012-0071052.
Office Action dated Apr. 1, 2014, issued from the corresponding Chinese patent application No. 201210226219.4. (English Translation not available).
Office Action dated Mar. 24, 2014, issued from the corresponding Mexican patent application No. MX/a/2012/007606. (English Translation not available).

* cited by examiner

*Primary Examiner* — Edward Tso
(74) *Attorney, Agent, or Firm* — Lesley M. Morrison; Borden Ladner Gervais LLP (57) ABSTRACT

A dock for receiving a portable electronic device, including: a housing comprising an aperture; a support coupled to an inner wall of the housing; and a charging connector received in the support and movable relative to the housing for charging the portable electronic device when the charging connector extends through the aperture, wiring of the charging connector for electrically communicating with a power source; wherein the charging connector is movable relative to the housing in response to a magnetic force.

15 Claims, 14 Drawing Sheets

PORTABLE ELECTRONIC DEVICE DOCK HAVING A CONNECTOR MOVABLE IN RESPONSE TO A MAGNETIC FORCE

CROSS REFERENCE TO RELATED APPLICATIONS

The present application claims the benefit of priority of U.S. Provisional Patent Application No. 61/503,450, filed Jun. 30, 2011, which incorporated herein by reference in its entirety.

TECHNICAL FIELD

The present application relates to charging and/or data transfer docks for portable electronic devices.

BACKGROUND DISCUSSION

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), tablets and laptop computers with wireless 802.11 or Bluetooth capabilities.

Portable electronic devices such as PDAs or smart telephones are generally intended for handheld use (that is, the devices are sized and shaped to be held or carried in a human hand) and ease of portability. Portable electronic devices are often placed in docks for charging or data transfer including transfer of information in any form optically or electrically from dock to portable electronic device and vice versa. Some docks are capable of both charging and data transfer. Docks and portable electronic devices are susceptible to damage due to connection attempts when the portable electronic device and the dock are not properly aligned.

BRIEF DESCRIPTION OF THE DRAWINGS

Embodiments of the present application will now be described, by way of example only, with reference to the attached Figures, wherein.

DETAILED DESCRIPTION

The following describes a dock for receiving a portable electronic device. The dock includes a charging connector moveable under a magnetic force into contact with a mating connector of the portable electronic device.

In an aspect of the present disclosure, there is provided a dock for receiving a portable electronic device, including a housing comprising an aperture; a support coupled to an inner wall of the housing; and a charging connector received in the support and movable relative to the housing for charging the portable electronic device when the charging connector extends through the aperture, wiring of the charging connector for electrically communicating with a power source; wherein the charging connector is movable relative to the housing in response to a magnetic force.

In another aspect of the present disclosure, there is provided a connector assembly for a dock, the connector assembly including: a support for coupling to an inner wall the dock; and a charging connector received in the support and movable relative to the dock in response to a magnetic force, the charging connector for charging a portable electronic device when the charging connector extends through an aperture of the dock, wiring of the charging connector for electrically communicating with a power source.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to a dock for a portable electronic device in the embodiments described herein. The dock may receive portable electronic devices including: mobile, or handheld, wireless communication devices such as pagers, cellular phones, cellular smart-phones, wireless organizers, tablets, global positioning system devices and personal digital assistants, for example. The portable electronic device may also be a portable electronic device without wireless communication capabilities, such as a handheld electronic game device, digital photograph album, digital camera, or other device. The portable electronic device may be, but need not be, a handheld device.

Figure 1:
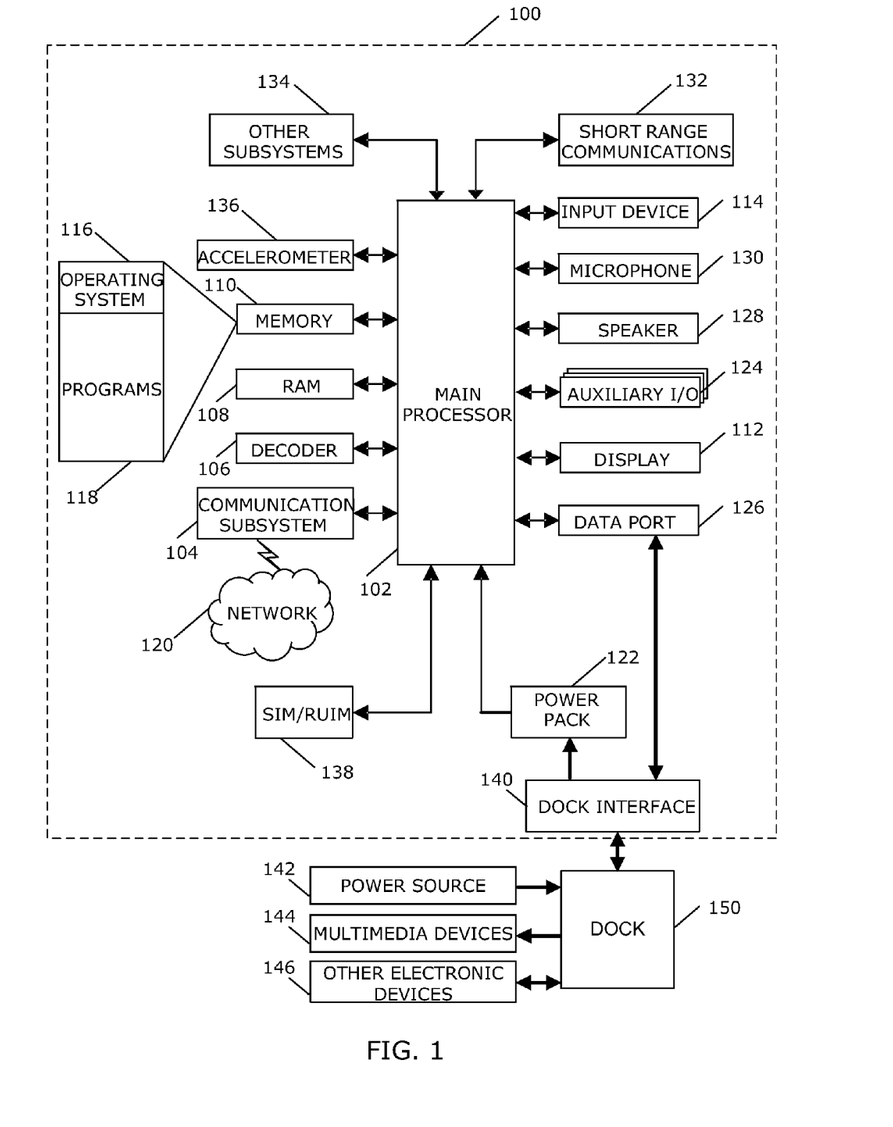
FIG. 1 is a simplified block diagram of components including internal components of a portable electronic device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 120. The wireless network 120 may be any type of wireless network, including, but not limited to, data wireless networks, voice wireless networks, and networks that support both voice and data communications.

A power pack 122, such as one or more rechargeable batteries or a port to an external power supply, powers the portable electronic device 100. A dock interface 140 may electrically communicate with a dock 150 to charge the power pack 122 and/or provide a data connection to a data port 126 of the portable electronic device 100. In general, components electrically communicate with one another when the electrical activity in one component affects an electrical activity in another. Electrical communication includes direct electrical contact that enables current flow. The dock interface 140 may include one or more mating connectors for electrically communicating with connectors of the dock 150. The dock 150 may communicate with one or more of a power source 142, multimedia devices 144 such as televisions, monitors, projectors or other output devices, for example, and other electronic devices 146. In some situations, communication may be electrical or optical or a combination of electrical and optical.

The processor 102 interacts with other components, such as Random Access Memory (RAM) 108, memory 110, a display 112, an input device 114, an auxiliary input/output (I/O) subsystem 124, the data port 126, a speaker 128, a microphone 130, short-range communications 132, and other device subsystems 134. The processor 102 may interact with an orientation sensor such as an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 120. Alternatively, user identification information may be programmed into memory 110.

The portable electronic device 100 includes an operating system 116 and software programs or components 118 that are executed by the processor 102 and are typically stored in a persistent, updatable store such as the memory 110. Additional applications or programs may be loaded onto the portable electronic device 100 through the wireless network 120, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 120 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
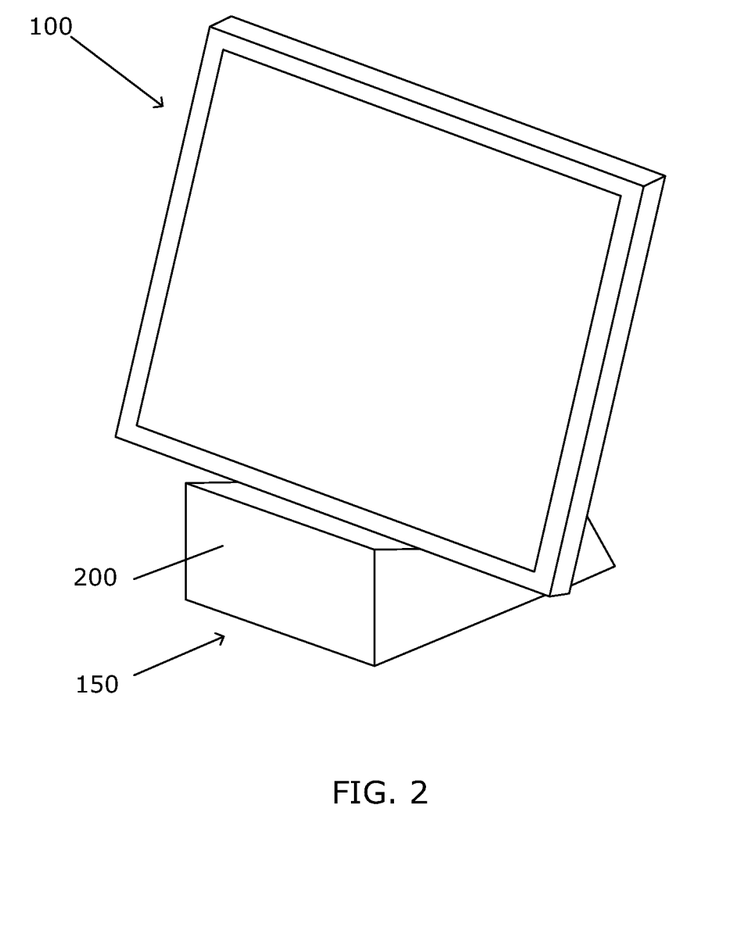
FIG. 2 is an isometric view of a portable electronic device received in a dock according to an example.
Figure 3:
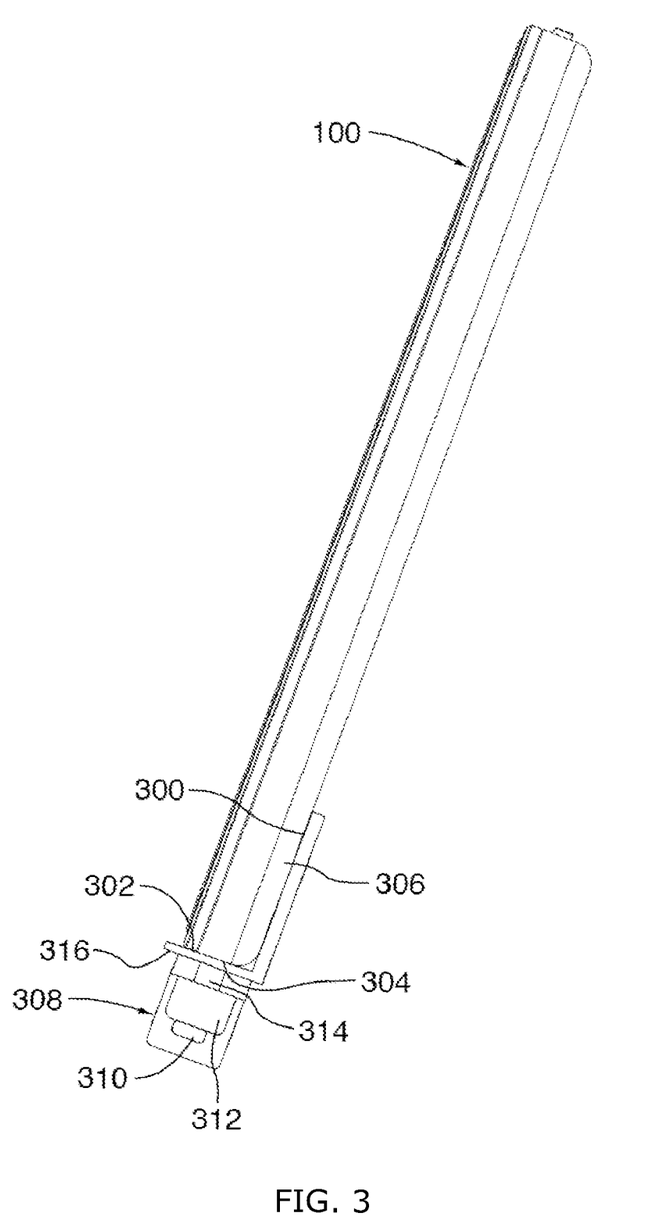
FIG. 3 is a side view of a portable electronic device received in the dock of FIG. 2 with a portion of a housing of the dock removed.

An example dock 200 for receiving a portable electronic device 100 is shown in FIGS. 2 and 3. The dock 150 includes a housing 200 that is shaped to receive the portable electronic device 100. In one example, the housing 200 includes a seat 302 and a support wall 300 for receiving the portable electronic device 100. In general, the support wall 300 and the seat 302 support the weight of a received portable electronic device 100, although in some of the embodiments depicted herein, the seat 302 may support more weight than the support wall 300. As shown in FIG. 3, an edge surface 304 of the portable electronic device 100 contacts the seat 302 of the housing 200 and a rear surface 306 of the portable electronic device 100 contacts the support wall 300 of the housing 200. The size and shape of the seat 302 and the support wall 300 and the angle between the seat 302 and the support wall 300 may be selected to accommodate different sizes and types of portable electronic devices 100.

The housing 200 may be molded plastic, machined metal or wood, for example. The housing may be a single part or may be an assembly of multiple parts.

The dock 150 includes a connector support assembly 308 that is coupled to an inner surface of the housing 200. In general, components are coupled to one another when movement of one component affects movement in the other component. Coupling may be permanent, such as by welding for example, or may be reversible, such as connection by fasteners, for example. Coupling may include direct contact between the two components or the components may be spaced from one another with additional components being provided to achieve coupling between the two components. In one example, screws 310 couple lugs 312 of the support assembly 308 to screw-receiving components 314, which extend from an underside surface 316 of the seat 302, to couple the support assembly 308 to the housing 200.

Figure 4:
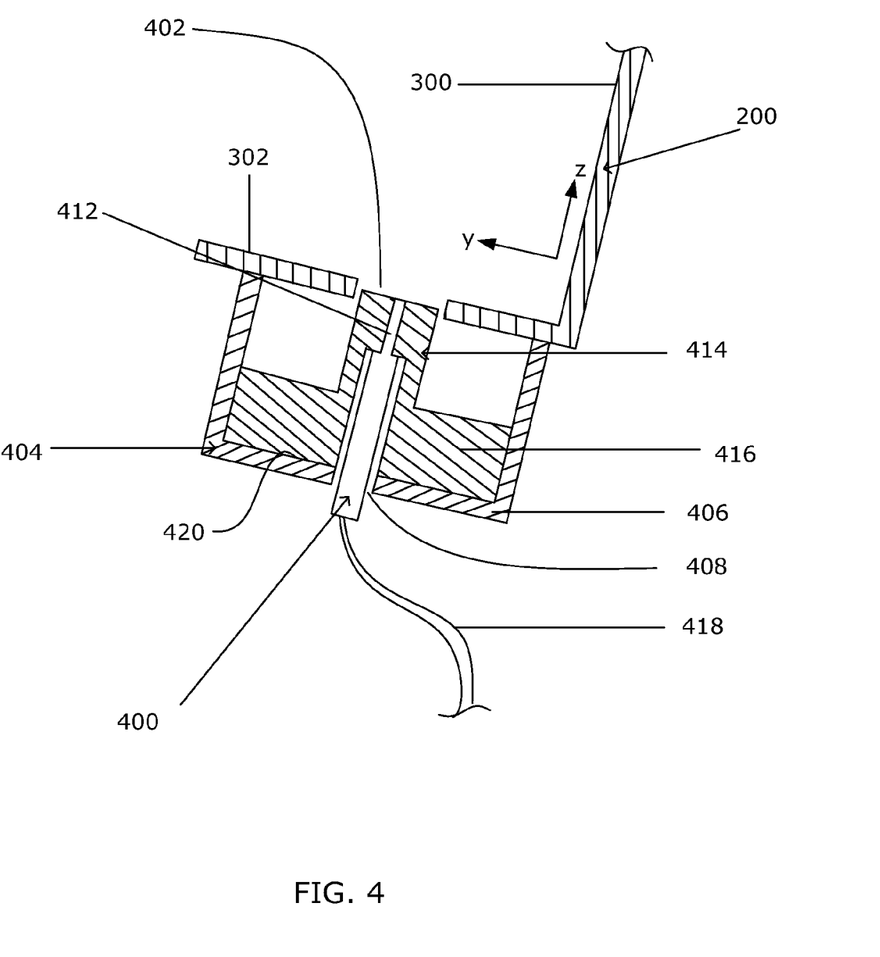
FIG. 4 is a side sectional view of portions of the dock of FIG. 2 with a charging connector in a stowed position.

Referring also to FIG. 4, the connector support assembly 308 receives a charging connector 400. The charging connector 400 may be capable of charging and data transfer. A connecting portion of the charging connector 400 may extend through an aperture 402, which is located in the seat 302. When the portable electronic device 100 is received in the dock 150, the charging connector 400 electrically communicates with the portable electronic device 100 to charge the portable electronic device 100 and/or provide a data connection thereto. In general, the portable electronic device 100 is received in the dock 150 when the portable electronic device 100 is generally supported thereby. Similarly, a first component may be received in a second component when the first component is supported by the second component. The first component may or may not be coupled to the second component and may move relative to the second component.

The connector support assembly 308 includes a support 404 including a base 406 having an opening 408 therethrough. The support defines a cavity for receiving the charging connector 400. The charging connector 400 includes electrical contacts 412 surrounded by a sleeve 414. Electrical insulation (not shown) is provided between the electrical contacts 412 and the sleeve 414. The sleeve 414 includes an enlarged base 416. The sleeve may be a ferrous material that may be attracted by a magnet on a mating connector of the portable electronic device 100 or may be a magnet for attracting a ferrous material on a mating connector of the portable electronic device 100. The electrical contacts 412 are coupled to the sleeve 414 by a press fit, for example. Alternatively, the electrical contacts 412 may be coupled to the sleeve 414 by snap-in parts, threads, or adhesives, for example.

Wiring 418 extends from the charging connector 400 for electrically communicating with a power supply (not shown), such as an electrical outlet, for example.

Figure 5:
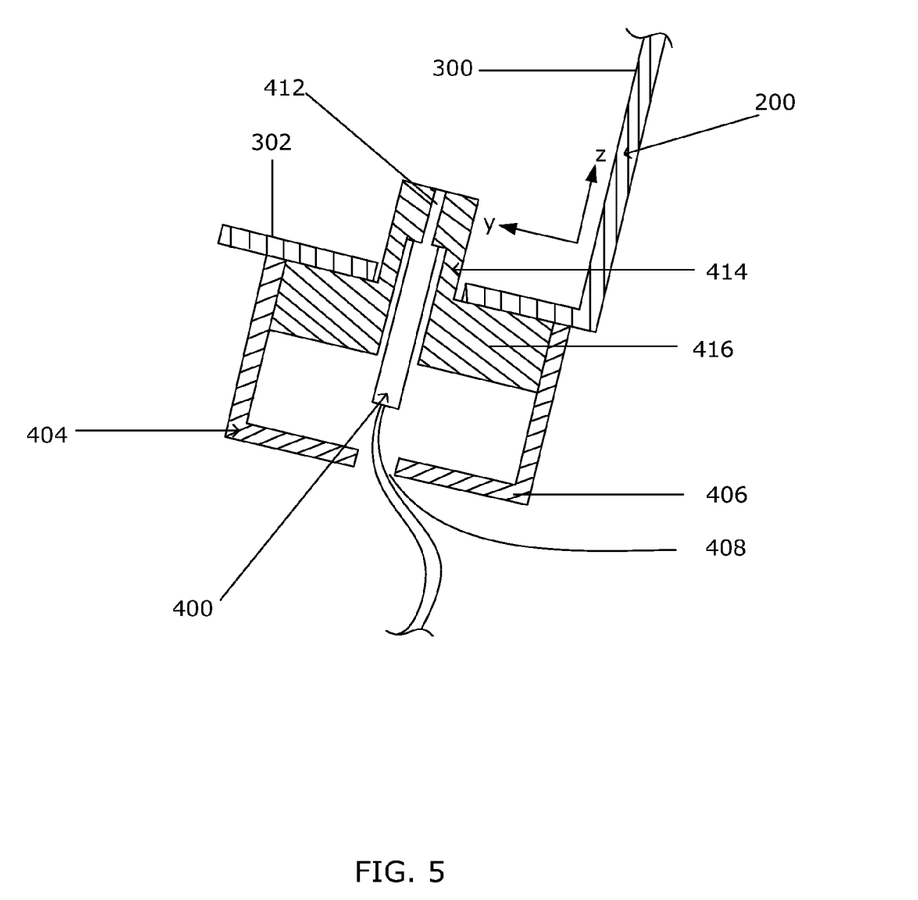
FIG. 5 is a side sectional view of portions of the dock of FIG. 2 with a charging connector in an extended position.

The charging connector 400 is movable through the cavity defined by the support 404 from a stowed position, which is shown in FIG. 4 to an extended position, which is shown in FIG. 5. When the charging connector 400 is in the stowed position, or starting position, in the dock 150, the enlarged base 416 of the sleeve 414 abuts an inner surface 420 of the base 406. When the charging connector 400 is in the extended position, the sleeve 414 is received through the aperture 402 of the dock 150 and the enlarged base 416 may abut an underside of the seat 302. The charging connector 400 moves in response to a magnetic force generated by a magnet, which surrounds the electrical contacts of the portable electronic device 100 in one example. The magnet has sufficient strength to attract the charging connector 400 of the dock 150, such that charging connector 400 moves automatically from the stowed position to the extended position, and maintain the electrical contacts of the dock 150 in contact with the electrical contacts of the portable electronic device 100. When the portable electronic device 100 is removed from the dock 150, the charging connector 400 returns to the stowed position of FIG. 3 under its own weight. Alternatively, the charging connector 400 may be biased toward the stowed position by a spring or other biasing device.

As shown in FIG. 4, a clearance is provided between the wall defining the aperture 402 and the charging connector 400. The charging connector 400 is movable in the z-direction through the aperture 402 and in the x and y directions within the aperture 402.

In operation, a user places the portable electronic device 100 on the seat 302 leaning against support wall 300 of the dock 150 for charging. When the magnet of the portable electronic device 100 is located near the charging connector 400, the sleeve 312 of the charging connector 400 is attracted to the magnet and the charging connector 400 moves toward the electrical contacts of the portable electronic device 100. When an axis of the charging connector 400 and an axis of the electrical contacts of the portable electronic device 100 are misaligned, the charging connector 400 also moves forward, backward and/or side-to-side in order to compensate for the misalignment between the electrical contacts of the dock 150 and the electrical contacts of the portable electronic device 100. In this way, there may be some automatic compensation for misalignment.

The dock 150 may include more than one connector that is magnetically attracted to a mating connector of a portable electronic device 100. The connector may support an electrical connection, an optical connection or a combination thereof. In addition, an alignment component may be provided to facilitate location of the mating connector of the portable electronic device 100 proximate the charging connector 400. The alignment component may be a rail, pin or slot, for example, for guiding the portable electronic device 100 into position.

In another example, the support assembly 308 is eliminated and a flange extends from the underside surface of the seat 302. The flange includes a return portion that is directed toward the charging connector 400. The return portion abuts the enlarged portion 416 of the sleeve 414 when the charging connector 400 is stowed in the housing 200. The charging connector 400 is movable from the stowed position to an extended position when a portable electronic device 100 is received in the dock 150.

In another example, the connector extends through an aperture in the support wall or other location in order to accommodate different locations of portable electronic device mating connectors.

Figure 6:
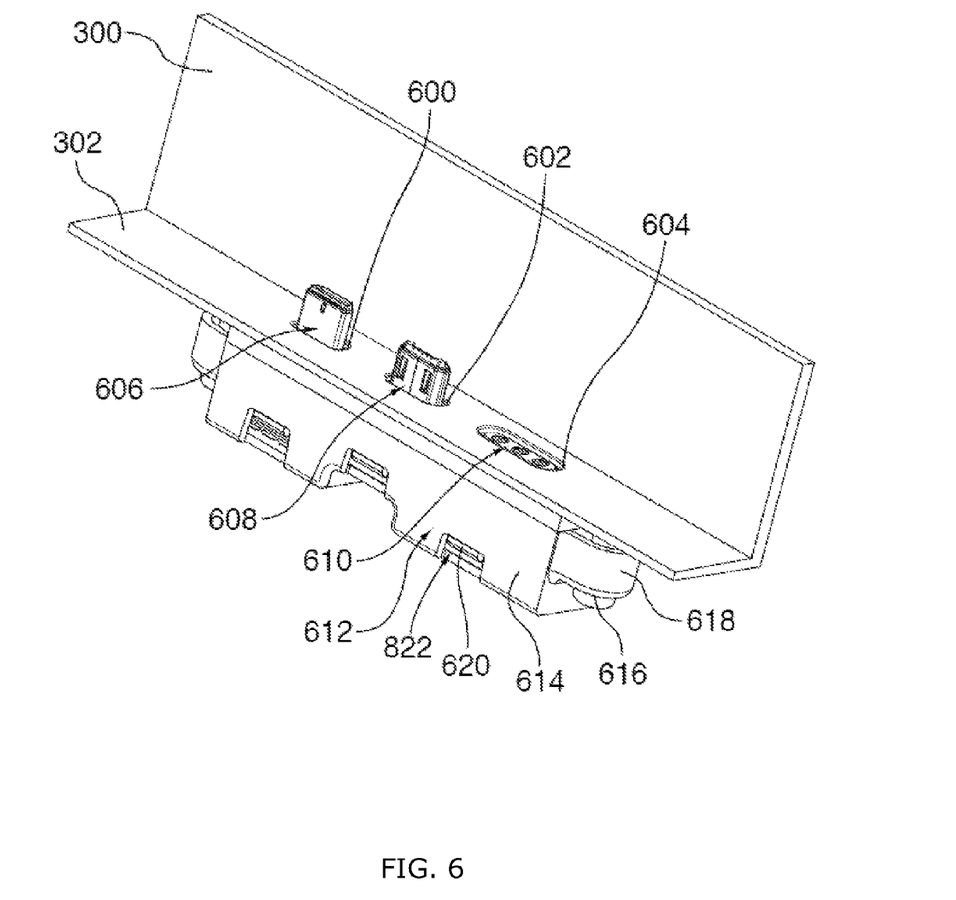
FIG. 6 is an isometric view of a dock according to another example with a charging connector in a stowed position.
Figure 7:
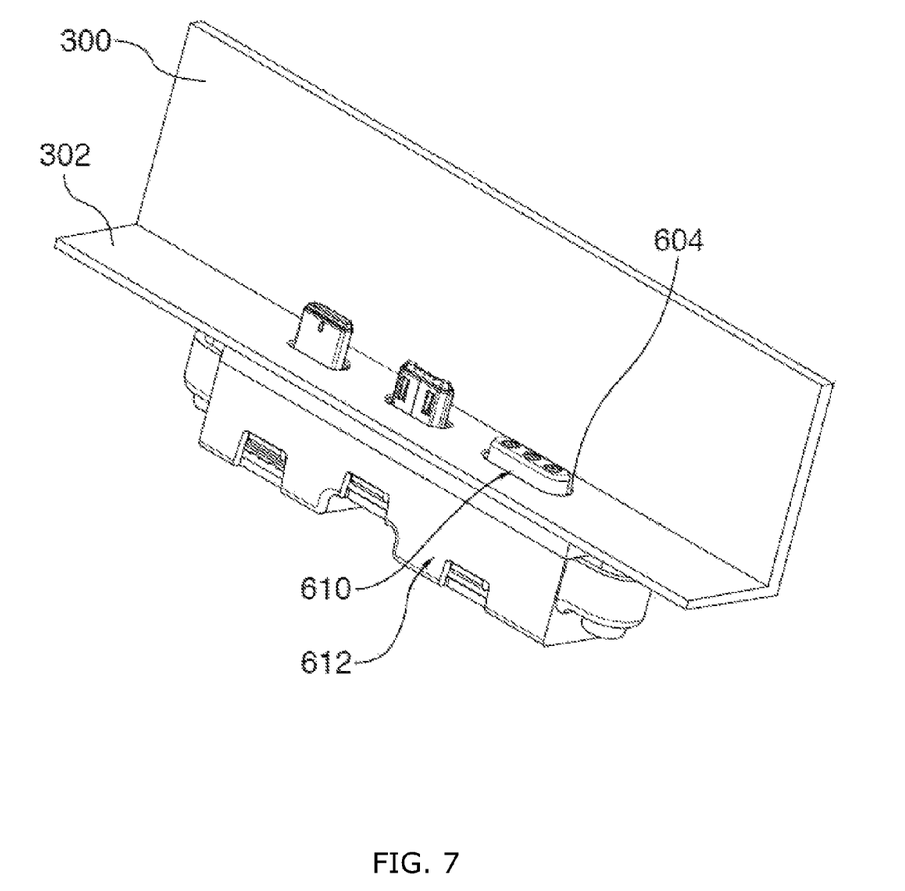
FIG. 7 is an isometric view of the dock of FIG. 6 with the charging connector in an extended position.

Referring now to FIGS. 6 and 7, another example of a dock 150 for a portable electronic device 100 is generally shown. In this example, the dock 150 includes apertures 600, 602, 604, which extend through the seat 302 of the housing 200. First and second data connectors 606 and 608 extend through apertures 600 and 602, respectively. A charging connector 610 extends through the aperture 604. When the portable electronic device 100 is received in the dock 150, the connectors 606, 608, 610 electrically or optically communicate with the portable electronic device 100 to provide data connections and charge the portable electronic device 10. In one example, the first data connector 606 is a micro HDMI connector for transferring data to multimedia devices and the second data connector 608 is a micro USB connector for exchanging data with other electronic devices. Other types of data connectors are also possible. In addition, the charging connector 610 may also transfer data.

Figure 8:
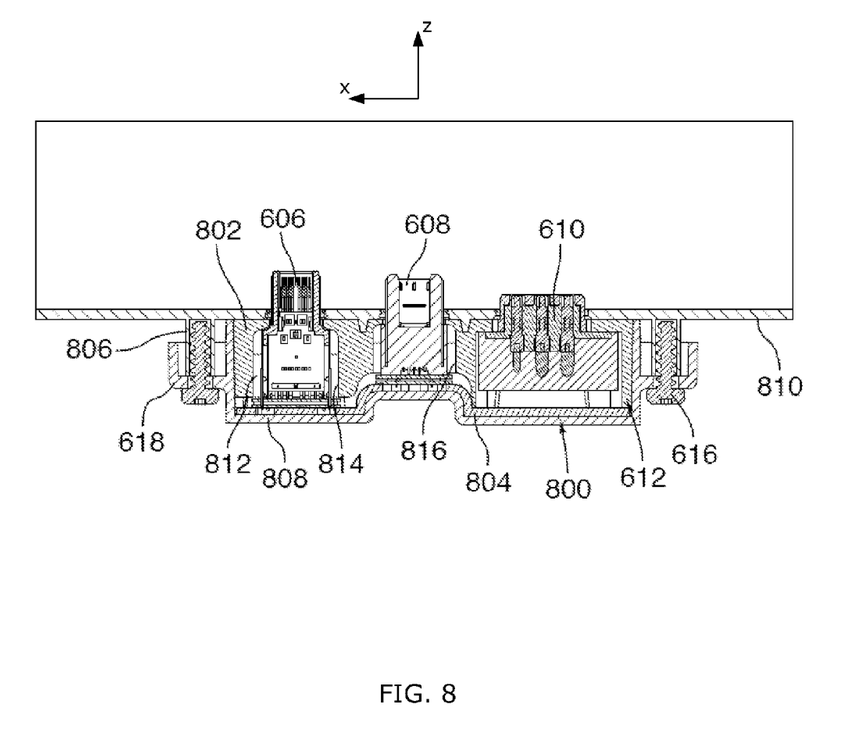
FIG. 8 is a front sectional view of the dock of FIG. 6.

The connectors 606, 608, 610 are mounted in a connector support assembly 612, which is coupled to an inner surface of the housing 200. Referring also to FIG. 8, screws 616 couple lugs 618 of the support assembly 612 to screw-receiving components 806, which extend from an underside surface 810 of the seat 302, to couple the support assembly 612 to the housing 200. Other arrangements for coupling the connector support assembly to the housing 200 are also possible.

Referring still to FIGS. 6, 7 and 8, the connector support assembly 612 includes a support tray 800, a spring component 802, which is located in the support tray 800, and a pad 804, which is disposed between a base 808 of the support tray 800 and the spring component 802. The spring component 802 includes tabs 620, which mate with openings 822 in front and rear walls of the support tray 800 to generally fix the spring component 802 relative to the support tray 800. Alternative arrangements for fixing the spring component 802 in the support tray 800 are possible including fasteners, such as screws, rivets or staples, glue, or other snap-in fastening arrangements. In addition, the spring component 802 may be sized so that an interference fit is provided between the spring component 802 and the connectors 606, 608.

Figure 9:
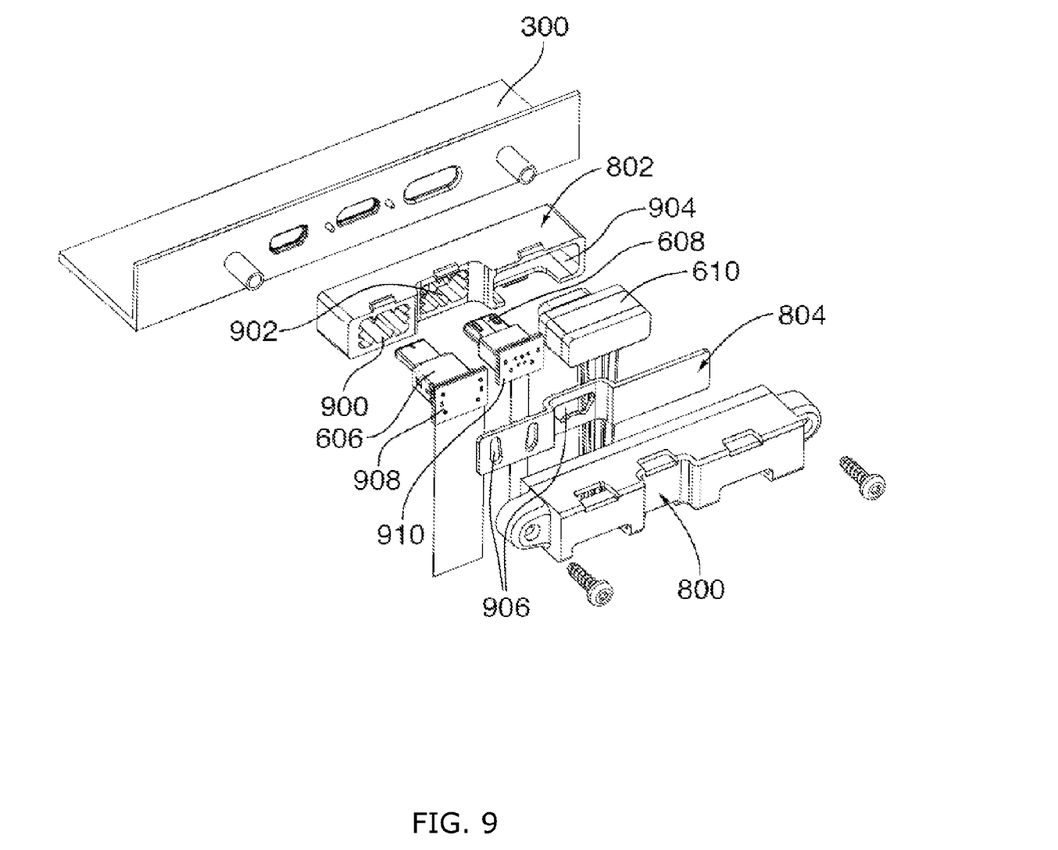
FIG. 9 is an exploded isometric view of the dock of FIG. 6.
Figure 10:
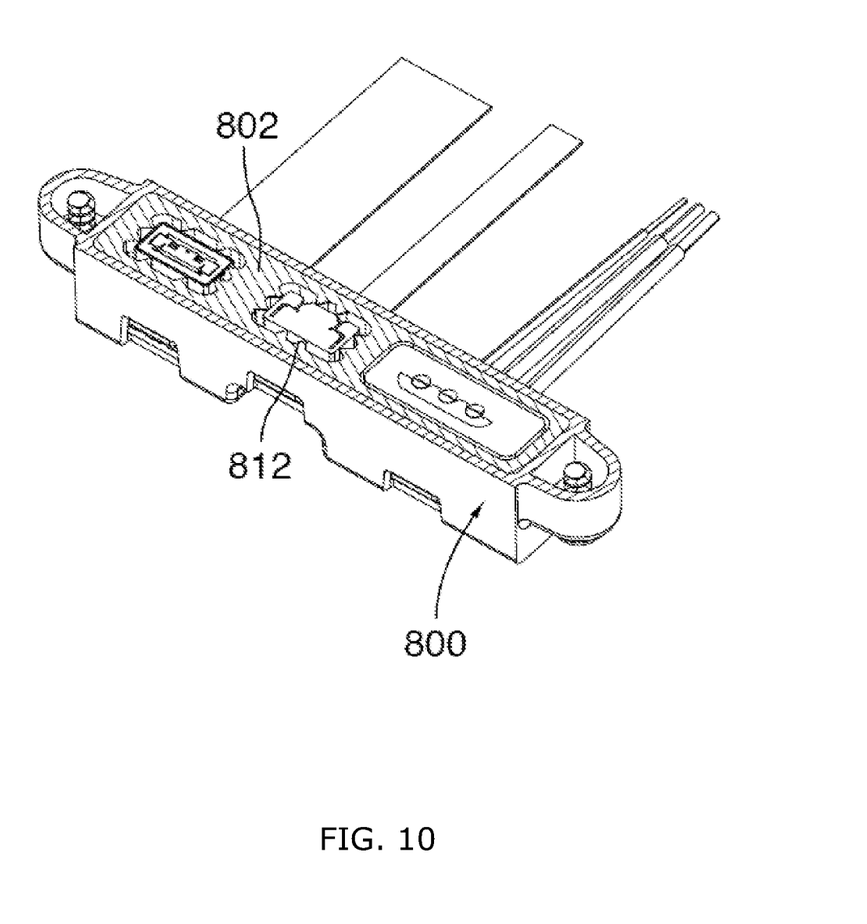
FIG. 10 is an isometric top sectional view of the dock of FIG. 6.

The spring component 802 includes passages 900, 902 and 904, which are shown in FIG. 9. The passages 900, 902 and 904 receive first and second data connectors 606, 608 and charging connector 610, respectively. Ribs 812 extend from inner walls 814 and 816 of passages 900 and 902 of the spring component 802, respectively. The ribs 812 contact the first and second data connectors 606, 608 in order to maintain the connectors 606, 608 in a starting position within the respective passages 900, 902. The spring component 802 is elastically deformable to accommodate movement of the connectors 606, 608 in the x and/or y directions. The spring component 802 is biased toward a non-deformed shape, which is shown in FIG. 10, or a slightly deformed state in which some deformation occurs in response to interference with the connectors 606, 608. An amount of movement of the connectors 606, 608 relative to the connector support assembly 612 may be determined by one of both of a rigidity of the spring component 802 and a size of the apertures 600 and 602, respectively. The spring component 802 facilitates independent movement of the connectors 606, 608, 610. Elastic deformation due to a force being applied to one of the connectors is not transferred to the other connectors through the spring component 802.

The spring component 802 is made from a flexible material such as silicone rubber, urethane rubber or cork, for example. A hard plastic having flexible fingers may alternatively be used.

The base 808 of the support tray 800 limits movement of the connectors 606, 608, 610 in the z-direction to facilitate coupling with mating connectors of the portable electronic device 10. The pad 804 is elastically deformable to accommodate some movement of the connector 606 and 608 in the z direction. The pad 804 may be interference fit with the connectors 606, 608 to bias the connectors 606, 608 toward the mating connectors of the portable electronic device 100 and absorb tolerances. The pad 804 is biased toward a non-deformed shape, which is shown in FIG. 8, and is compressible in response to a downward, or axial, force on the connectors 606, 608. In one example, the pad 804 is two-shot or overmolded onto the support tray 800 to reduce the part count of the dock 150.

As shown in FIG. 9, apertures 906 extend through the pad 804. Referring also to FIG. 8, the apertures 906 are aligned with the through-hole leads of the connectors 606, 608, which protrude through an opposite surface of printed circuit boards (PCB), 908, 910 of the first and second data connectors 606, 608, respectively. The apertures 906 generally protect the leads and solder joints of the PCB 908, 910 from stress during assembly and use when the portable electronic device 100 is inserted into and removed from the dock 150.

Figure 11:
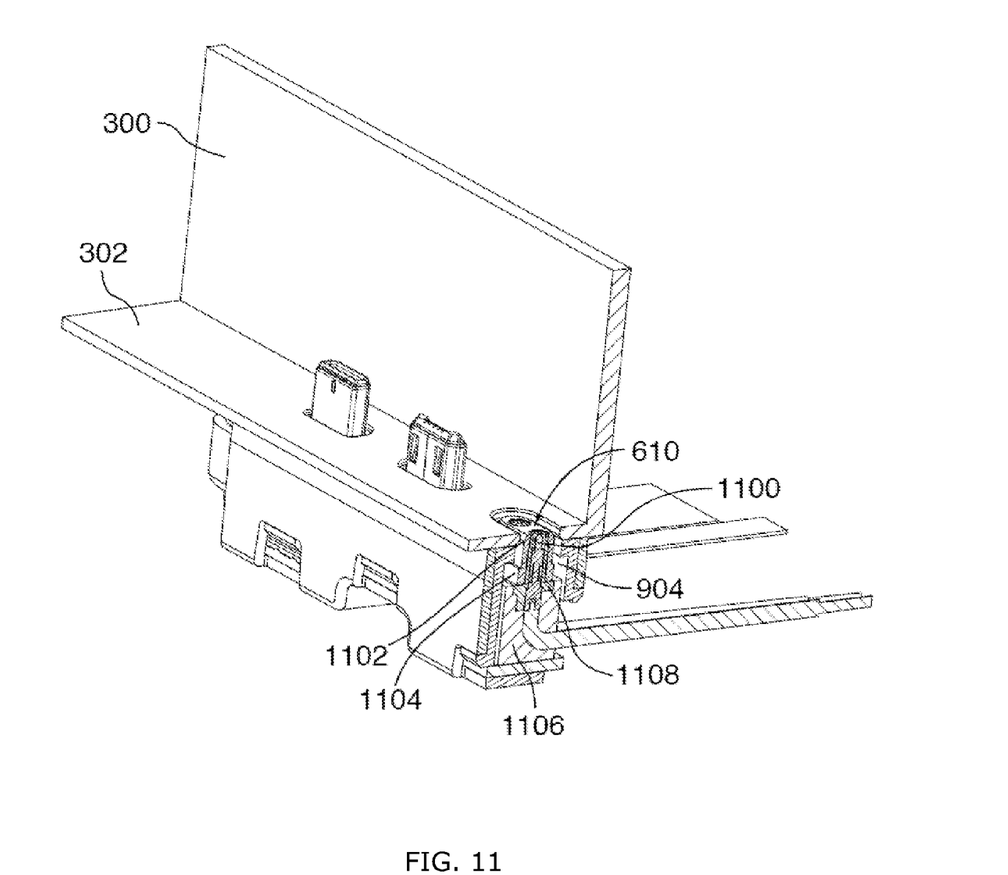
FIG. 11 is a isometric side sectional view of the dock of FIG. 6 with the charging connector in the stowed position.
Figure 12:
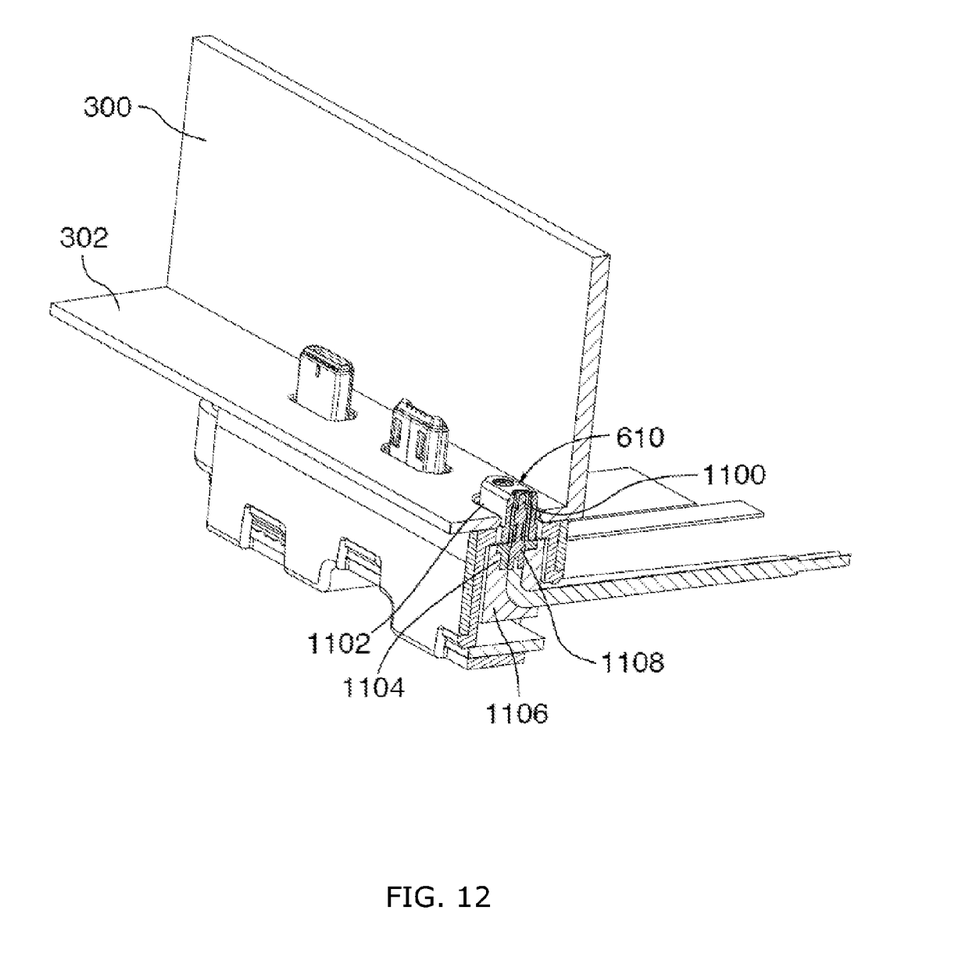
FIG. 12 is a isometric side sectional view of the dock of FIG. 6 with the charging connector in the extended position.

Referring to FIGS. 11 and 12, the charging connector 610 includes electrical contacts 1100 surrounded by a sleeve 1102. An electrical insulation component 1108 is located between electrical contacts 1100 and the sleeve 1102. The sleeve 1102 includes an enlarged base 1104. The sleeve 1102 may be a ferrous material that may be attracted by a magnet on a mating connector of the portable electronic device 100 or may be a magnet for attracting a ferrous material on a mating connector of the portable electronic device 100. The electrical contacts 1100 are coupled to the sleeve 1102 by a press fit, for example. Alternatively, the electrical contacts 1100 may be coupled to the sleeve 1102 by snap-in parts, threads, or adhesives, for example.

A connector base 1106 is coupled adjacent to the enlarged base 1104 of the sleeve 1102. The connector base 1106 is slidable through passage 904. The connector base 1106 may be made of a PVC, a polyurethane overmold or may be a separate soft or hard plastic component.

Figure 13:
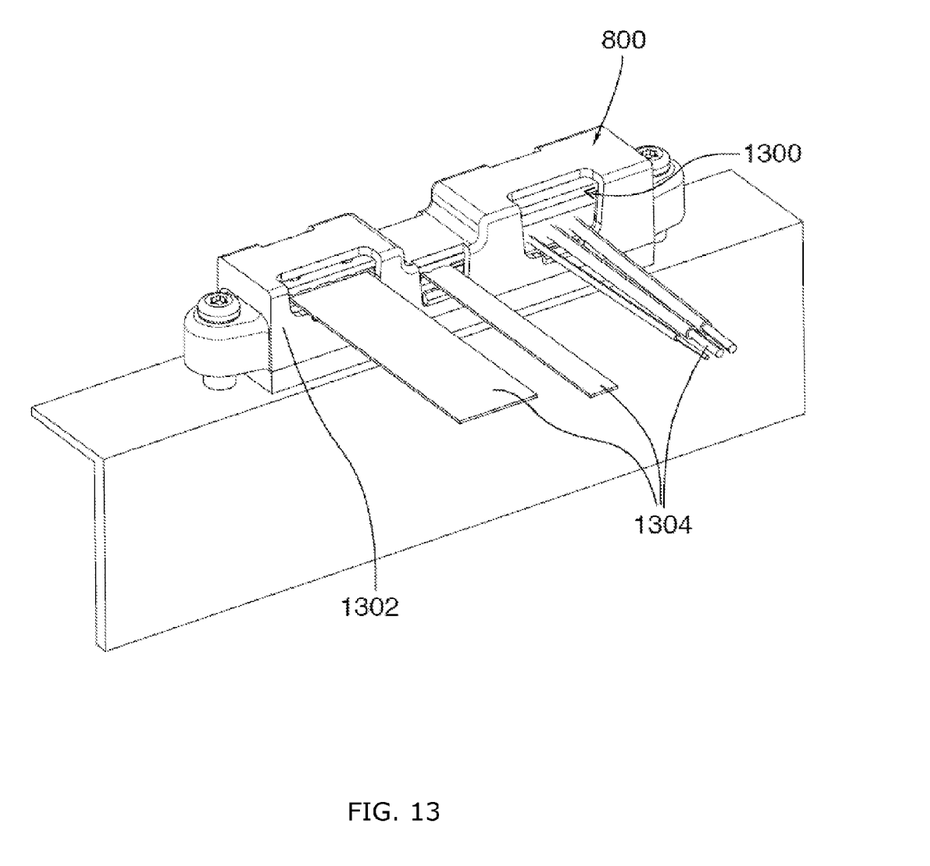
FIG. 13 is an isometric rear bottom view of the dock of FIG. 6.
Figure 14:
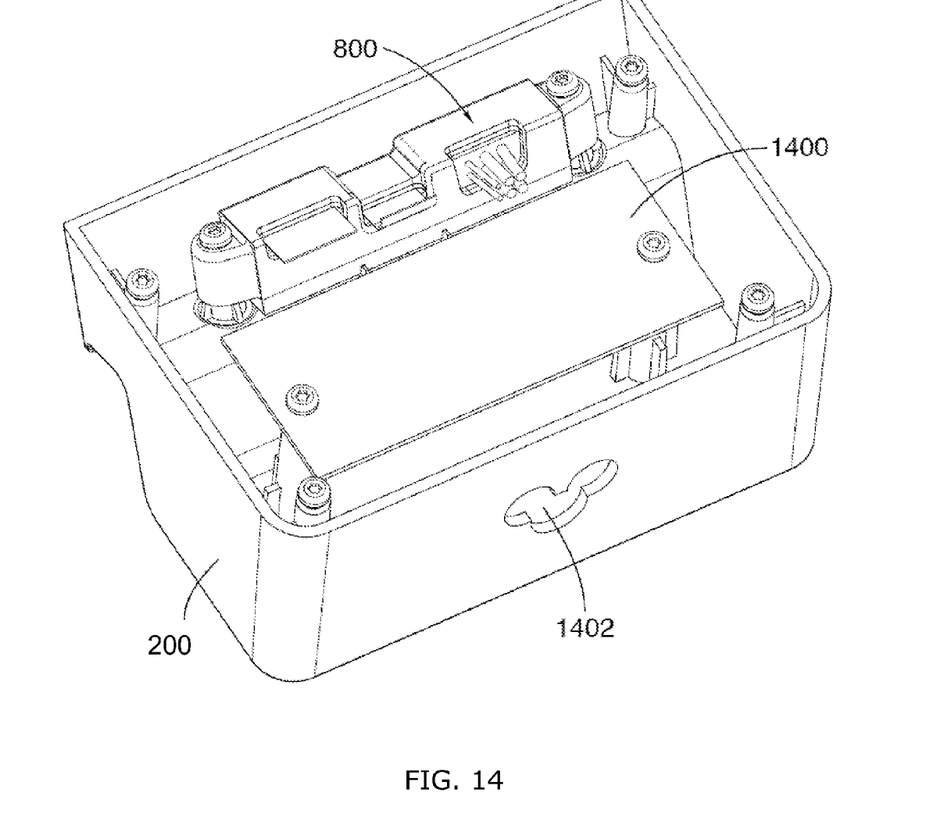
FIG. 14 is an isometric view similar to FIG. 12 including additional components of the dock.

Referring also to FIG. 13, the support tray 800 includes openings 1300, which extend through a rear wall 1302 of the support tray 800 to allow wiring 1304 of the connectors 606, 608, 610 to extend therethrough. The wiring 1304 may be flexible cables, such as electrical conductors or optical cables, for example, coupled between the connectors 606, 608, 610 and an electronic device (not shown), a multimedia device (not shown) and a power source (not shown), respectively. In one example, the flexible cables are coupled to a connector (not shown) that is mounted on a main PCB 1400 coupled inside the housing 200, as shown in FIG. 14. The flexible cables may alternatively be soldered to the main PCB 1400. When a main PCB is not included, the flexible cables may be soldered, crimped or inserted into mating pins of one or more connectors. Wiring for electrically communicating with the electronic device, multimedia device and power source may extend through opening 1402.

The charging connector 610 is movable in the z direction through the passage 904 between a stowed position, which is shown in FIGS. 6 and 11, and an extended position, which is shown in FIGS. 7 and 12. The charging connector 610 is a floating connector that is biased toward the stowed position and moveable under a magnetic force to the extended position. As shown in FIGS. 6 and 8, a clearance is provided between the wall defining the aperture 604 and the charging connector 610. The charging connector 610 is movable in the z-direction through the aperture 604 and in the x and y directions within the aperture 604.

In operation, a user visually and/or tactilely aligns mating connectors of the portable electronic device 100 with the connectors 606, 608 and 610 of the dock 150 and then moves the mating connectors into engagement with the connectors 606, 608, 610. When the mating connectors are not aligned with the connectors 606, 608 in the x and/or y directions, a force is imparted on one or both of the connectors 606, 608 by the portable electronic device 100. The spring component 802 elastically deforms in order to accommodate movement of the one or both of the connectors 606, 608 in response to the force. Multiple forces may be applied to the connectors 606, 608 in various different directions while the user attempts to join the connectors of the portable electronic device 100 and dock 150. The charging connector 610 moves toward the mating charging connector of the portable electronic device 100 when the magnet of the mating charging connector is near the charging connector 610. When an axis of the charging connector 400 and an axis of the electrical contacts of the portable electronic device 100 are misaligned, the charging connector 400 also moves in the x and y directions in order to compensate for the misalignment between the electrical contacts of the dock 150 with the electrical contacts of the portable electronic device 100.

Once connected, the connectors 606, 608 may return to the their starting positions or one or both of the connectors 606, 608 may continue to be offset from the starting position due to the additive tolerances of the mating connectors of the portable electronic device 100. The connector 610 remains in the extended position until the portable electronic device 100 is removed from the dock 150.

In the multiple connector example, because the charging connector 610 does not extend outside of the housing 200 when in the stowed position, portable electronic devices that use a different charging arrangement may still couple to the data connectors 606, 608 of the dock 150.

The connector support assembly and connector(s) may be provided as a single connector assembly that may be mounted in any dock. The connector support assembly may be manufactured to meet specifications associated with docks of different portable electronic devices.

The dock 150 described herein may realize one or more advantages, some of which have already been described. The charging connector of the dock 150 facilitates quick and easy connection by allowing a user to place a portable electronic device 100 in the seat 302 and slide the portable electronic device 100 in a direction that aligns a mating connector of the portable electronic device 100 with the charging connector. When the mating connector is close to the charging connector, the charging connector will move toward the mating connector and couple thereto. The user need not locate the portable electronic device perfectly on the dock 150 because the charging connector is able to compensate for some misalignment of the mating connector. Removal of the portable electronic device 100 from the dock is similarly quick and easy. The portable electronic device 100 may be lifted from the dock 150 with sufficient force to overcome the magnetic connection or the portable electronic device 100 may be slid along the seat 302 with sufficient force to overcome the magnetic connection and then lifted out of the dock 150. Damage resulting from stress on both the portable electronic device 100 and the dock 150, which is normally associated with connection and removal operations, may be avoided.

Further, the dock 150 may be usable with portable electronic devices that do not support a magnetic charging connection. Because the charging connector is stowed below the seat 302, when the magnetic charging connection is unsupported, no interference between the charging connector and the portable electronic device occurs. This may be particularly useful when the dock 150 includes an additional connector, such as data connector 606, 608. Many different portable electronic devices may include multimedia output capability, for example, and dock 150 is able to connect to such devices even when the devices do not support a magnetic charging connection.

The connector(s) and connector support assembly may be an independent unit that may be mounted in many different types of housings. In addition, different types of connectors may be mounted in the connector support assembly so that customization for different dock housings is possible. Housing 200 supports the portable electronic device 100 in a position that allows a user to interact with the portable electronic device 100. Other dock housings may support the portable electronic device 100 in different positions.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A dock for receiving a portable electronic device, comprising:
    a housing comprising an aperture;
    a support coupled to an inner wall of the housing; and
    a charging connector comprising a sleeve at least partly surrounding electrical contacts of the charging connector, the sleeve comprising a ferrous material separated from the electrical contacts by electrical insulation, the charging connector received in the support and movable relative to the housing for charging the portable electronic device when the charging connector extends through the aperture, wiring of the charging connector for electrically communicating with a power source;
    wherein the charging connector is movable relative to the housing in response to a magnetic force.

2. A dock as claimed in claim 1, wherein the sleeve comprises an enlarged base that is larger than the aperture to limit movement of the charging connector through the aperture.

3. A dock as claimed in claim 2, wherein the enlarged base of the sleeve is biased toward a stowed position in which the enlarged base abuts a base of the support.

4. A dock as claimed in claim 1, wherein the charging connector is in an extended position when charging and is biased toward a stowed position under the weight of the charging connector when not charging.

5. A dock as claimed in claim 1, comprising a first data connector, a second data connector and the charging connector received in the support.

6. A dock as claimed in claim 1, wherein the charging connector is also a data connector.

7. A dock as claimed in claim 5, wherein the first data connector is a micro USB connector and the second data connector is a micro HDMI connector.

8. A dock as claimed in claim 1, wherein a clearance is provided between the charging connector and a wall defining the aperture and movement of the charging connector relative to the housing is limited by the wall.

9. A dock as claimed in claim 5, wherein the support is a support assembly comprising a spring component received in a support tray, the first connector, second connector and charging connector being received in the spring component.

10. A dock as claimed in claim 1, wherein the wiring comprises flexible cables.

11. A dock as claimed in claim 1, wherein the support comprises lugs for receiving screws to couple the support to the housing.

12. A dock as claimed in claim 1, wherein the aperture extends through a seat of the housing.

13. A connector assembly for a dock, the connector assembly comprising:
    a support for coupling to an inner wall of the dock; and
    a charging connector comprising a sleeve at least partially surrounding electrical contacts of the charging connector, the sleeve comprising a ferrous material separated from the electrical contacts by electrical insulation, the charging connector received in the support and movable relative to the dock in response to a magnetic force, the charging connector for charging a portable electronic device when the charging connector extends through an aperture of the dock, wiring of the charging connector for electrically communicating with a power source.

14. A connector assembly as claimed in claim 13, wherein the sleeve comprises an enlarged base that is larger than the aperture for limiting movement of the charging connector through the aperture.

15. A connector assembly as claimed in claim 14, wherein the enlarged base of the sleeve is biased toward a stowed position in which the enlarged base abuts a base of the support.

* * * * *